Aug. 4, 1953  H. LANG  2,647,500
VALVE GEAR FOR DIESEL ENGINES
Filed Aug. 10, 1951  2 Sheets-Sheet 1
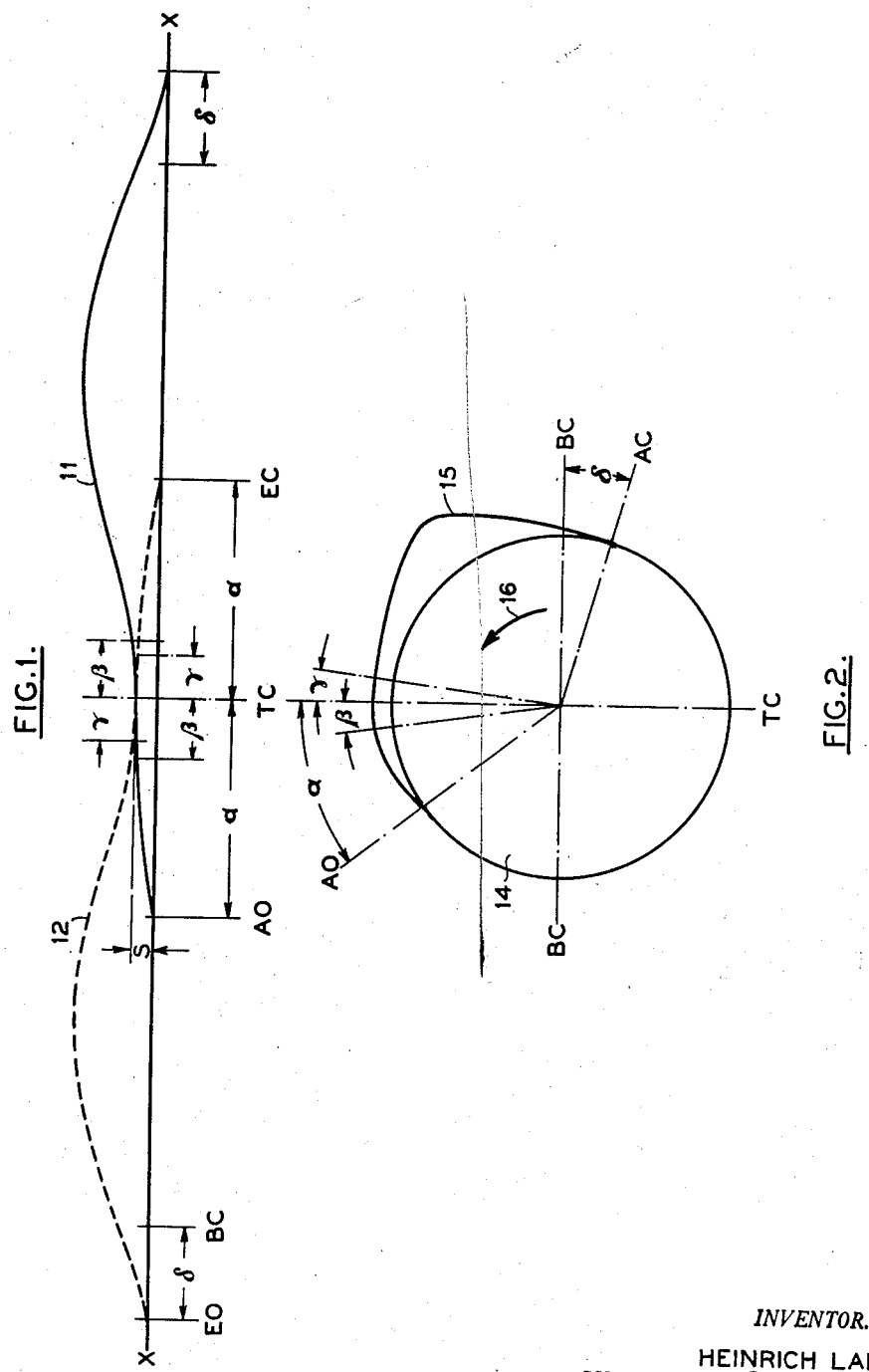
INVENTOR.
HEINRICH LANG
BY
ATTORNEY

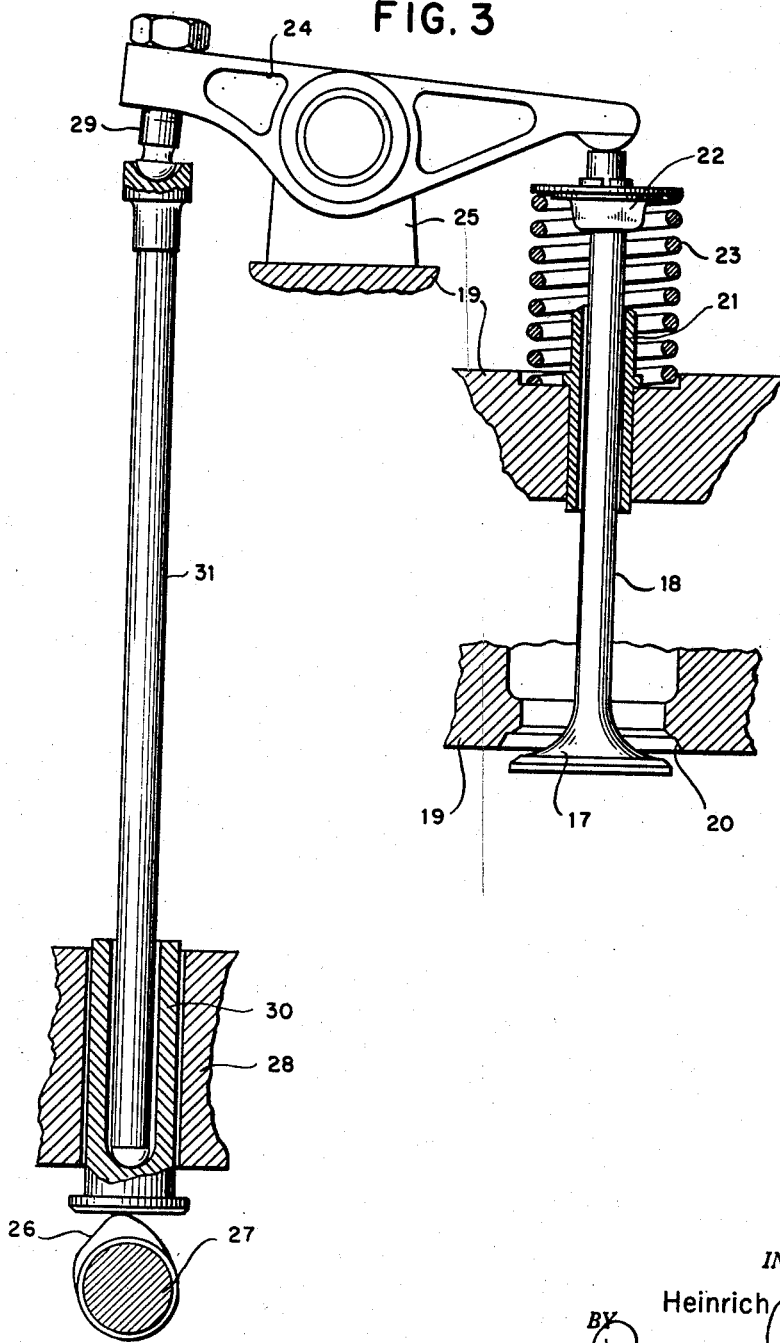

Patented Aug. 4, 1953

2,647,500

UNITED STATES PATENT OFFICE 2,647,500

VALVE GEAR FOR DIESEL ENGINES

Heinrich Lang, Munich, Germany

Application August 10, 1951, Serial No. 241,259
In Germany October 28, 1950

3 Claims. (Cl. 123—90)

My invention relates to valve gears for diesel engines, particularly for pressure charged diesel engines with high compression, and to the method of timing the valve operation in such engines.

It has been experienced with such engines that maximum power output can be achieved only if the combustion chambers and the engine cylinders are thoroughly scavenged and efficiently cooled by the scavenging air. This, however, requires a considerable overlapping of the valve opening periods in the top dead center, that is, a considerably advanced opening of the admission valve or valves ahead of top dead center and a considerably retarded closing of the exhaust valve or valves beyond top dead center. As in engines with high compression the engine piston comes so close to the bottom surface of the cylinder head that only insufficient intermediate space remains to permit the lift of the valve, it has been customary to countersink the valves in the bottom surface of the cylinder head. The depressions or cavings resulting therefrom influenced, however, the flow of air in the cylinder, the compression and the combustion very unfavorably.

The principal object of my invention is to overcome the said disadvantages. To this effect I arrange the admission valve or valves and the exhaust valve or valves in the cylinder head with their seats at least approximately flush with the bottom surface of the cylinder head and I operate and construct the valve gear in such manner that the lift of the admission valve after its initial opening and of the exhaust valve before its final closing is kept practically constant during a certain time ahead of and beyond the top dead center to avoid any contact between the lifted valve discs and the engine piston.

The said and other objects of my invention will be more fully understood from the following specification when taken with the accompanying drawing in which:

Fig. 1 shows the lift diagram for an admission valve and for an exhaust valve of a combustion engine in relation to the crank circle, Fig. 2 a schematic view of a valve cam constructed according to the diagram of Fig. 1, and Fig. 3 a valve gear for an overhead admission valve arranged in the cylinder head of a combustion engine and actuated by a camshaft mounted in the crank case.

In Fig. 1 the line $x$—$x$ designates the developed crank circle, TC the top dead center and BC the bottom dead center. The lines 11 and 12 designate the lift diagrams for the admission valve and for the exhaust valve, respectively. As indicated in Fig. 1 the admission valve opens at AO when the crankshaft is $\alpha$ degrees ahead of the top dead center TC and it closes at AC when the crankshaft is $\delta$ degrees beyond the bottom dead center BC. The exhaust valve opens at EO when the crankshaft is $\delta$ degrees ahead of the bottom dead center BC and it closes at EC when the crankshaft is $\alpha$ degrees beyond top dead center TC.

The diagram of Fig. 1 shows that the lift of the admission valve reaches a certain initial value $s$ at $\beta$ degrees before top dead center TC which value $s$ remains at least approximately constant up to $\gamma$ degrees after the top dead center TC has been passed. The said initial lift $s$ is selected in a manner familiar to any expert in accordance with the volumetric conditions of the cylinder space above the piston when the same is near top dead center in order to avoid any contact between the piston crown and the partially lifted valve disc. Similarly the lift of the exhaust valve before closing reaches the same or a similar value $s$ at $\gamma$ degrees before top dead center TC and this lift is maintained at least approximately constant up to $\beta$ degrees beyond the top dead center TC.

Fig. 1 shows further that the curves 11 and 12 illustrating the valve lifts of the admission valve and of the exhaust valve, respectively, are fully symmetrical in view of the top dead center TC. And said figure also shows that the lift of both the admission valve and the exhaust valve are practically identical and do not surpass the said value $s$ while the crankshaft moves from $\gamma$ degrees ahead of top dead center TC to $\gamma$ degrees beyond the same.

The values of $\alpha$, $\beta$, $\gamma$ and $\delta$ as cited above will in normal cases be about as follows:

$\alpha$ between 60 and 70 degrees,
$\beta$ between 30 and 40 degrees,
$\gamma$ between 5 and 10 degrees,
$\delta$ between 30 and 50 degrees.

Fig. 2 illustrates schematically a cam 14 for an admission valve the acting surface 15 of which has been derived in known manner from the desired valve lift diagram 11 shown in Fig. 1. The line TC—BC indicates the dead center line. The cam, which rotates at half the speed of the crank shaft of the engine in the direction of arrow 16, starts to raise the valve at AO which is $\alpha$ degrees ahead of top dead center TC. Between $\beta$ degrees before top dead center TC up to $\gamma$ degrees after top dead center TC the active cam surface is circular so that the lift of the valve remains constant at the value s as illustrated in Fig. 1. Thereupon the active cam surface is shaped to effect continuing valve lifts as indicated by the line 11 in Fig. 1 up to the closing of the valve at AC at δ degrees beyond bottom dead center BC.

A complete valve gear constructed according to the invention is shown in Fig. 3. A suspended admission valve with valve disc 17 and valve rod 18 is mounted in the cylinder head 19. The valve disc 17 faces the cylinder bore and cooperates with the valve seat 20 arranged flush in the bottom surface of the cylinder head. The valve rod 18 is guided in the sleeve 21 mounted in the upper wall of the cylinder head 19 and is supported by the head disc 22 resting upon the valve spring 23. Said valve rod 18 is actuated by the swing arm 24 which is supported by a dog 25 resting on the cylinder head 19. The valve cam 26 constructed according to my invention is mounted on the shaft 27 which is mounted in the crank case 28 of the engine and rotates at half the speed of the crank shaft and said valve cam operates upon the adjusting screw 29 mounted in said swing arm 24 by means of the ram 30 and the push rod 31.

The valve gear for the exhaust valve or valves will be similarly constructed with the only difference that the cam 26 is to be mounted in reverse position upon the shaft 27.

Having shown and described a specific embodiment of my invention to illustrate the principles thereof it will be well understood that my invention may be otherwise embodied without departing from such principles.

What I claim as my invention is:

1. In a valve gear for a diesel engine with high compression, which engine includes a cylinder, a cylinder head topping the same, and at least one admission valve and at least one exhaust valve mounted in the head to open against the cylinder bore: an actuating member in each valve gear lifting the admission valve or valves ahead of top dead center and keeping the exhaust valve or valves open beyond top dead center, said actuating member adapted to hold transitorily, while the piston is in and near top dead center between the exhaust stroke and the following inlet stroke, each partially lifted valve in such lifted position that contact between the piston and the valves is avoided when the clearance between the top of the piston and the bottom of the head at top dead center is less than the lift of the valves from said bottom.

2. In a cam-operated valve gear for diesel engines with high compression which include an engine cylinder, a cylinder head topping the same, at least one admission valve and at least one exhaust valve mounted in the head to open against the cylinder bore, the improvement consisting therein that the acting surface of each cam effecting the lift of one valve includes an essentially cylindrical portion to keep the initial lift of the admission valve or valves ahead of top dead center and the lift of the exhaust valve or valves before final closing beyond top dead center transitorily constant while the piston is in and near top dead center between the exhaust stroke and the following inlet stroke, in order to avoid contact between the piston and the lifted valves when clearance between the top of the piston and the bottom of the head is less than the lift of said valves from said bottom.

3. In a cam-operated valve gear for diesel engines with high compression which include an engine cylinder, a cylinder head topping the same, at least one admission valve and at least one exhaust valve mounted in the head flush with its bottom surface and opening against the cylinder bore, the improvement consisting therein that the acting surface of each cam effecting the lift of one valve includes an essentially cylindrical portion to keep the initial lift of the admission valve or valves ahead of top dead center and the lift of the exhaust valve or valves before final closing beyond top dead center transitorily constant while the piston is in and near top dead center between the exhaust stroke and the following inlet stroke, in order to avoid contact between the piston and the lifted valves when clearance between the top of the piston and the bottom of the head is less than the total lift of said valves.

HEINRICH LANG.

No references cited.